United States Patent [19]

Delignieres

[11] 3,781,774

[45] Dec. 25, 1973

[54] METHOD FOR DETERMINING THE DISTANCE TRAVELLED OVER BY VEHICLE WITH RESPECT TO A REFERENCE SURFACE, MAKING USE OF THE DOPPLER'S EFFECT AND DEVICE THEREFOR

[75] Inventor: Robert Delignieres, Colombes, France

[73] Assignee: Institut Francais Du Petrole Des Carburants Et Lubrifiants, Rueil-Malmaison (Haute-de-Seine), France

[22] Filed: Aug. 4, 1971

[21] Appl. No.: 168,922

[30] Foreign Application Priority Data

Aug. 13, 1970 France .............................. 7029970

[52] U.S. Cl. ................................... 340/3 D, 343/9
[51] Int. Cl. ............................................. G01s 9/66
[58] Field of Search ..................... 340/3 D; 343/8, 9

[56] References Cited
UNITED STATES PATENTS 3,099,832  7/1963  Frelich ................................ 340/3 D
3,496,524  2/1970  Stavis et al. ......................... 340/3 D

*Primary Examiner*—Richard A. Farley
*Attorney*—Craig, Antonelli & Hill

[57] ABSTRACT

The method according to this invention comprises transmitting from a ship, acoustic signals of a predetermined frequency along at least one inclined direction with respect to the water bottom surface, detecting the signals reflected from said surface at a receiving location, during steady intervals of time during which the transmission is interrupted, determining the difference between a counting time interval corresponding to a predetermined number of cycles of the transmitted signals and a counting time interval corresponding to the same number of cycles of the received signal, the mean recurrence period of the successive interruptions, calculated on a predetermined whole number of periods, lower than the total number of periods of a complete transmission stage, being maintained constant and consequently independent from the variations of the distance from the ship to the bottom surface, until the end of the transmission stage, and deducing therefrom the distance travelled over by the vehicle.

22 Claims, 14 Drawing Figures

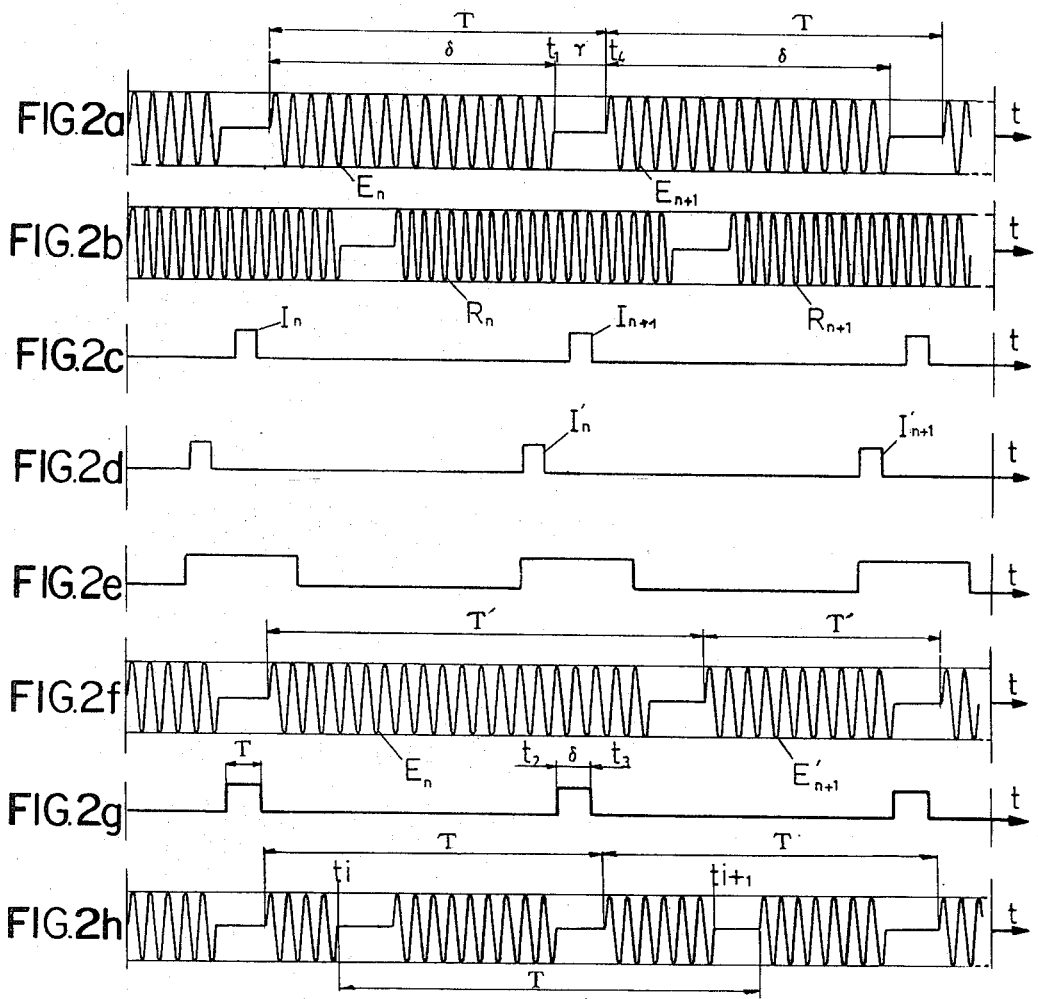
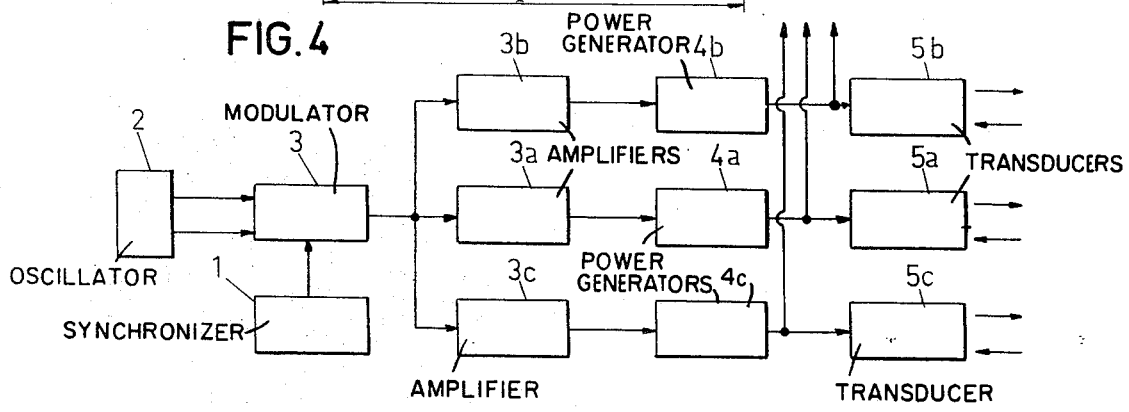

METHOD FOR DETERMINING THE DISTANCE TRAVELLED OVER BY VEHICLE WITH RESPECT TO A REFERENCE SURFACE, MAKING USE OF THE DOPPLER'S EFFECT AND DEVICE THEREFOR

This invention relates to a navigation method making use of the Doppler's effect for the determination of the distance travelled over by a vehicle with respect to a reference surface.

The invention relates more particularly to the determination of the distance travelled over by a vehicle moving in or on a water body, with respect to the submerged ground surface.

Amongst the methods already known in this field, there can be mentioned those which consist of transmitting ultrasonic waves of a steady frequency towards the submerged ground and along one or more oblique directions with respect to the vertical line passing through the vehicle, of receiving the ultra-sonic waves diffused back from the submerged surface, of calculating from the difference between the transmission frequency and the reception frequency resulting from the Doppler's effect, the velocity of the vehicle or the distance travelled over along planes determined by said oblique directions.

A first embodiment of these methods comprises transmitting acoustic waves in a continuous manner and receiving the echos of said waves by means of receiving transducers separate from the transmitting transducers. The major disadvantage of a continuous transmission results from the acoustic coupling between the transmitters and the receivers. As a result of a mechanical coupling, of transmission leaks and of parasitic motions, if any, such as rolling and pitching, the receivers are permanently receiving a variable portion of the signals at the transmission frequency. This results in a widening of the Doppler's frequency spectrum and in a variable error in the detection of the central frequency of said spectrum which is detrimental to the liability of the measurement.

Other embodiments comprise transmitting signals of a duration at most equal to the travel time of the acoustic waves between the vehicle and the reference surface along the oblique directions of transmission and reception. The transmission time may vary by steps, when the distance between the vehicle and the reference surface increases or decreases by a predetermined amount, or in a continuous manner. In the later case, the transmission time is made proportional to the distance between the vehicle and the surface. This distance is sensed by means of an echo-sounder along a vertical line or along the transmission and reception directions. The reception time and, accordingly, the reccurence period of the transmitted signals, depend on said distance from the vehicle to the reference surface.

The use of said embodiments has the double advantage, due to the transmission by pulses, of making possible the use of a single transducer along each transmission direction and of removing the effects of acoustic coupling observed in the case of a continuous transmission.

However it is known that, in the case of transmission by pulses, the width of the prevailing frequency band of the spectrum of the transmitted frequencies is in inverse ratio with the transmission line and comprises a set of "lines" whose spacing is in inverse ratio with the recurrence period of the transmissions. Since the transmission time must not exceed the propagation time of the signals over the path forth and back between the vehicle and the surface, the central band of the transmission spectrum is of a variable width which increases as the length of said path decreases. This widening of the band has an effect on the quality and the accuracy of the frequency or frequency shift measurements.

It is an object of the invention to provide a method making use of the Doppler's effect, for determining the distance travelled over by a vehicle with respect to a reference surface, whereby the above mentioned disadvantages can be avoided.

It is another object of the invention to provide a device for practising this method.

The method according to this invention comprises transmitting acoustic signals of a predetermined frequency along at least one inclined direction with respect to the water bottom surface, detecting the signals reflected from said surface at a receiving location, determining the difference between a counting time interval corresponding to a predetermined number of cycles of the transmitted signals and a counting time interval corresponding to the same member of cycles of the received signal and deducing therefrom the distance travelled over by the vehicle.

This method is remarkable in that the detection is performed during steady intervals of time during which the transmission is interrupted and in that the mean recurrence period of the successive interruptions, calculated on a predetermined whole number of periods, lower than the total number of periods of a complete transmission stage, is maintained constant and consequently independent from the variations of the distance from the vehicle to the surface, until the end of the transmission stage.

This method is further remarkable in that:

a. the counting time intervals are measured, during each transmission interruption, on a number of cycles which is substantially constant inside each transmission stage;

b. the length of each transmitted signal is at least equal to the interruption time interval;

c. the transmission time intervals may be constant.

Modified embodiments of the method permit to avoid the errors otherwise observed when the water depth reaches critical values at which the length of the transmission period between two successive interruptions is close or substantially equal to the propagation time of the signals from the ship to the bottom surface and back.

These modified embodiments comprise:

a. providing further irregular interruptions of the transmission during which the measurements are performed, when the constant recurrence period between the regular interruptions is substantially equal to the propagation time of the signals;

b. shifting one of each pair of successive transmission interruptions when the transmission time of the signals is substantially close to the propagation time of the signals;

c. nullifying a measurement when the transmission time of the signals between two successive transmission interruptions is substantially equal to the propagation time of the signals and delaying the following interruption.

In order to improve the accuracy of the measurements, the starting time of each measurement is delayed with respect to the moments of transmission interruption, in accordance with the distance from the ship to the water bottom.

Other particular features and advantages of the method and of the device arrangement for performing the same will be apparent from the following description given with reference to the accompanying drawings wherein:

FIGS. 2a–2h show chronograms of various signals generated by the device for performing the invention;

Figure 5:
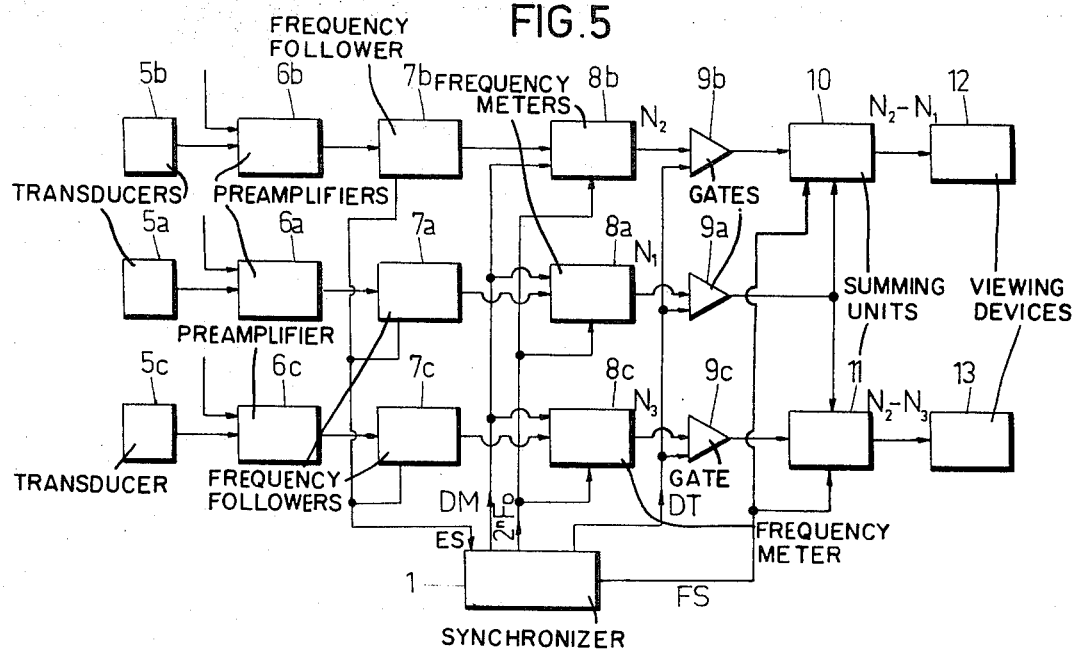
Figure 6:
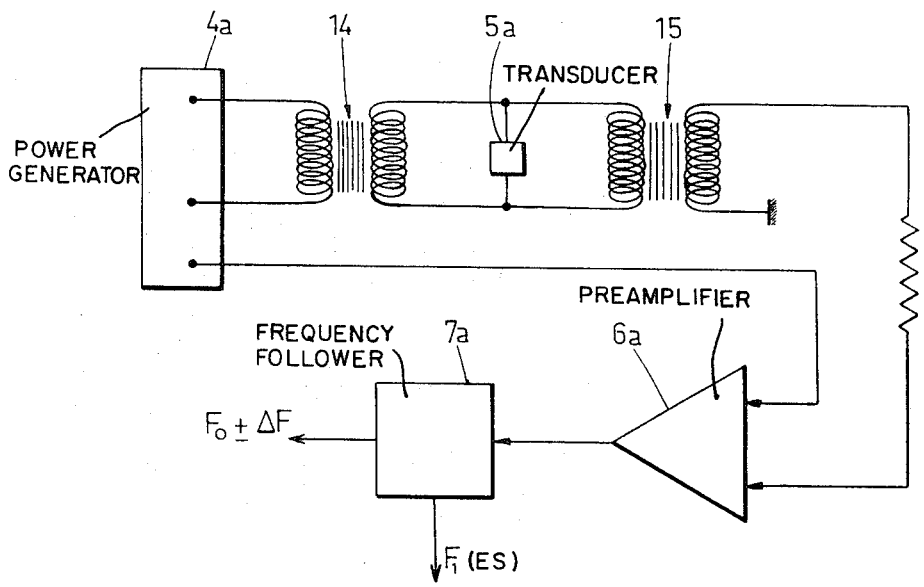
Figure 7:
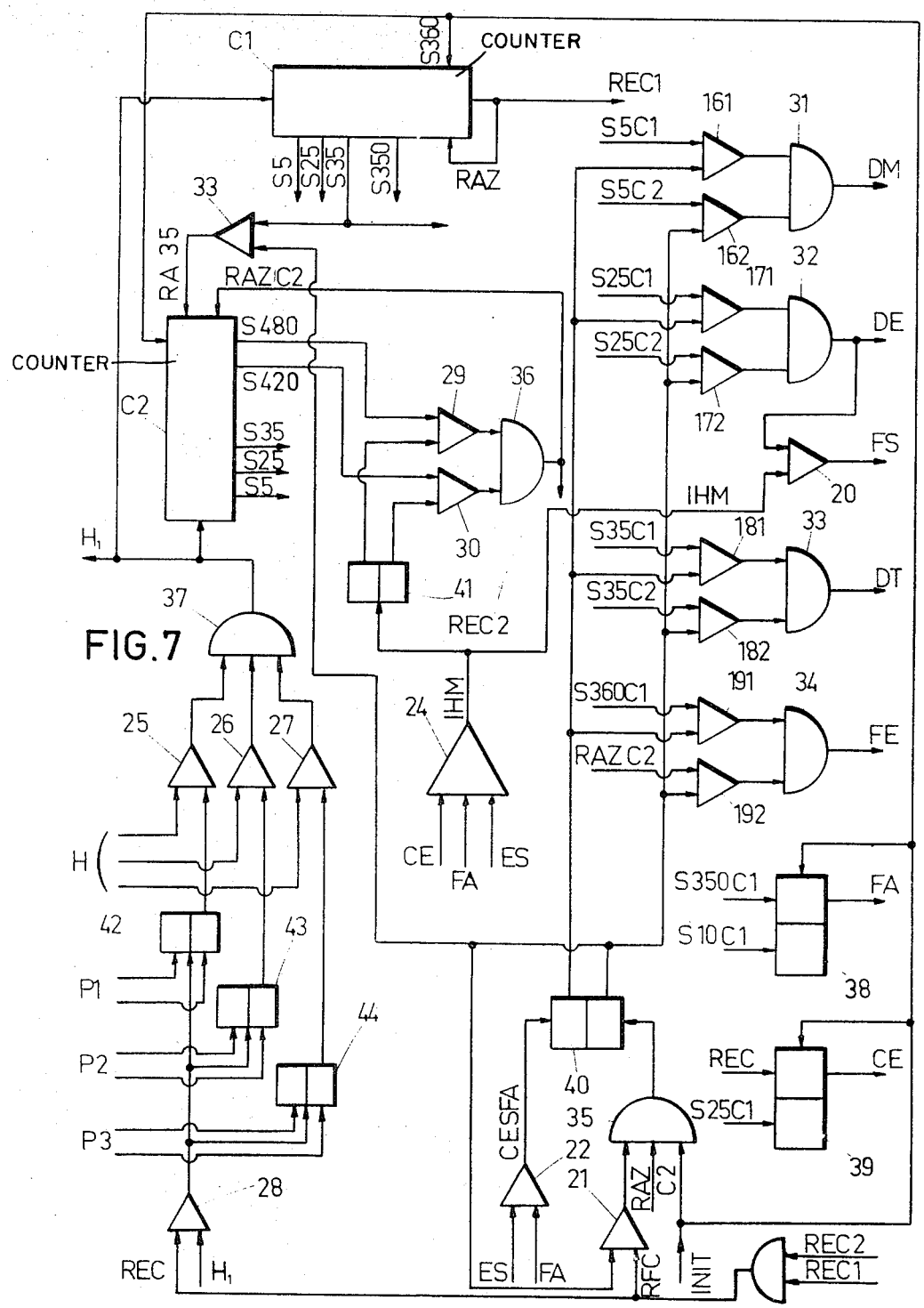

FIG. 4 diagrammatically shows the set for transmitting signals;

FIG. 5 diagrammatically shows the set for receiving the signals;

FIG. 6 diagrammatically shows the device for eliminating the transmitted signals at the reception set; and FIG. 7 diagrammatically shows the synchronizer sequentially controlling the operations performed by the receiving-transmitting device.

Figure 1:
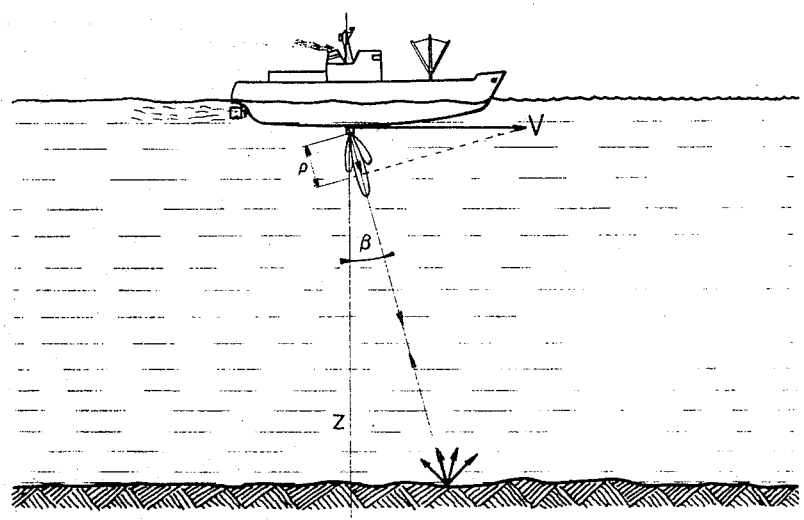
FIG. 1 shows the position of a transmission and reception beam in the particular case where the invention is used for determining the distance travelled over by a ship.

Referring now more particularly to FIG. 1, it can be seen that the vehicle is provided with at least one transmitter-receiver, secured for example, onto the hull.

The axis of the acoustic wave transmitter-receiver is placed, for example, in a vertical plane containing the longitudinal axis of the vehicle and along a direction inclined with respect to the vertical line which, in such a case, is used as a reference direction. $\beta$ is the angle formed by the direction of the transmission beam with respect to a vertical line and $p$ is the projection of the velocity vector $\vec{V}$ of the vehicle on the axis of the transmission beam.

$\Delta F$ being the difference between the frequency of the transmitted acoustic waves and that of the acoustic waves diffused back from the submerged reference surface, the value of $p$ is given by the equation:

$$p = \lambda_o/2 \ \Delta F \quad (1)$$

wherein $\lambda$ is the wave length of the signals transmitted through water.

The projection $p$ being equal to $V \sin \beta$, the velocity of the vehicle has the following relationship with $\Delta F$:

$$V = \lambda_o/2 \sin\beta \ \Delta F \quad (2)$$

in view of the preceding relationship (1).

For convenience, and by way of example, the angle $\beta$ has been chosen equal to 30°.

The distance travelled over during an interval $\Delta t$ is then equal to:

$$E = \lambda_o \cdot \Delta F \cdot \Delta t \quad (3)$$

The chronogram in FIG. 2 (diagram $a$) shows that the transmission is formed by a series of signals $E_n$, $E_{n+1}$ ... etc, each of a duration $\delta$ and separated by time intervals of transmission interruption of a constant duration $\gamma$. The recurrence period of the signals will be designated by $\Gamma$ and the frequency and the period of the oscillation forming the transmission, respectively by $F_o$ and $T_o$.

The echos $R_n$, $R_{n+1}$ ... etc ... received by the transducer (diagram 2b), are formed of signals at a frequency $F'$ and a period $T'$, delayed with respect to the corresponding transmitted signals ($E_n$, $E_{n+1}$ ... etc ...) by a time interval equal to the propagation time interval of the transmitted signals over the distance from the vehicle to the surface and back.

The method consists of determining, during any one of the interruptions of duration $\gamma$, the duration at the reception of a predetermined number $N'$ of periods of the signal received during this interruption and at the same time the duration of the same number $N'$ of periods of the signal at the transmission frequency $F_o$.

These durations are calculated from the period $t_o$ of a signal at a frequency $f_o$, multiple of the frequency of the transmitted signal. For example $f_o$ is chosen of a value:

$$f_o = 2^n F_o \quad (4)$$

$N_1$ and $N_o$ are the respective numbers of periods $t_o$ included in $N'$ periods of the received signal and of the transmitted signal.

The Doppler's frequency difference $\Delta F$ between the frequency $F'$ of the received signals and the frequency $F_o$ of the transmitted signals is:

$$\Delta F = (1/T') - (1/T_o) \quad (5)$$

By a simple transformation, taking care of the above mentioned values the equation (5) there can be written:

$$\Delta F = (N_o - N_1/N_1 N_o) \cdot (N'/t_o) \quad (6)$$

In view of the approximate equality of $N_1 N_o$ and $N_o^2$ in practice, the relationship (6) gives:

$$\Delta F \approx (N_o - N_1/N_o) \cdot (1/T_o) \quad (7)$$

in view of the ratio of $N_o$ to $N'$.

From relationship (3) the distance travelled over by the vehicle during the time interval $\Gamma$ can be expressed as follows:

$$E_T \approx \lambda_o (N_o - N_1)/N_o \cdot \Gamma/T_o = \lambda_o (N_o - N_1)/2^n N' \cdot \Gamma/T_o \quad (8)$$

Assuming that:

$$\Gamma/T_o = N \quad (9)$$

and moreover that a constant ratio is maintained between the recurrence period $\Gamma$ and the duration of the time interval measuring the number $N'$ of periods of the signal at the transmission frequency $F_o$, i.e., that the ratio:

$$N/2^n N' = 2^\rho \quad (10)$$

is constant, the relationship (8) is simplified as follows:

$$E_p \approx \lambda_o (N_o - N_1) 2^\rho \quad (11)$$

As shown in diagram $b$ of FIG. 2 the transmitting-receiving transducer is activated, during a certain portion of the reccurence period $\Gamma$, both by the transmitted signals and the received signals. The measurements being performed only during the interruptions of transmission will however relate only to the echo-signals of the transmitted signals.

It is also apparent that the echos $R_n$, $R_{n+1}$ ... etc ... of the transmitted signals are delayed by a time interval equal to the waves propagation time forth and back $T_{AR}$, proportional to the distance from the vehicle to the submerged surface. When $T_{AR}$ is substantially equal or close to the recurrence period of the transmitted signals, the interruptions between the successive echos are completely or partly in coincidence with the interruptions between the successive transmitted signals. These disturbances occur when the distance from the vehicle to the bottom is equal to or a multiple of a critical distance proportional to $\Gamma$. At each of these depth distances, hereinafter called "critical distances" or in the vicinity thereof, the measurements have a chance of being erratic.

One of the major features of the method consists of transmitting, during each transmission interruption, and along the one or more transmission directions, an eccho-sounding signal of short duration (diagram 2c).

The moment of arrival of this signal is determined with respect to a reference time interval centered on each transmission interruption and longer than the latter (diagrams $d$ and $e$). If the echo $I'_n$ of the echo-sounding signal arrives during this reference time interval but, for example, before the beginning of one of the intervals of interruption of the transmission of signal $E_n$, the distance from the vehicle to the bottom surface has a value close to that corresponding to one of the critical distances.

In order to avoid the possible measurement disturbances which could result therefrom, the transmission time of the signal is increased by a time interval which is sufficient for making possible to carry out the measurement on the regular portion of the echo $R_n$ for example (diagram $f$).

For maintaining constant a mean recurrence period between the successive transmissions $E_n$, $E_{n+1}$ ... etc ... and thereby making easier the calculation of the distances travelled over by the vehicle, the duration of the next transmitted signal, e.g., $E'_{n+1}$ is shortened.

$\Gamma'$ and $\Gamma''$ being two successive recurrence periods, $\Gamma''$ is chosen in order that:

$$\Gamma' + \Gamma'' = 2\Gamma \quad (12)$$

This operation is repeated at each time when the vehicle is close to a critical distance with respect to the bottom surface.

Of course, as long as no coincidence between the reference time interval and the echo of the successive echo-sounding signals occurs, the value $\Gamma$ of the reccurence period is maintained unchanged.

In the critical case where the echo of one of the echo-sounding pulses $I_n$ coincides at least partly with one of the interruption intervals $\gamma$, i.e., when the distance from the vehicle to the bottom surface is substantially equal to a critical distance, the corresponding measurement is completely erratic.

A first modified embodiment of the method consists in cancelling the recordings of the measurements at each time when a coincidence has been detected and multiplying the result of the first accurate measurement performed when the vehicle is out from this critical distance, by the number of cancelled measurements so as to maintain constant at a value of $2^\rho$ the ratio between the recurrence period $\Gamma$ and the measuring time interval.

According to a second modified embodiment, an operation similar to the previously described one is carried out. When a coincidence is observed between an interval $\gamma$ and the echo of the echo-sounding signal, the length of the following transmitted signal, e.g., $E_n$, is increased so as to make possible an accurate measurement during the following cycle. As precedingly the mean duration of the $\Gamma$ interval, calculated on a pair of successive cycles, has to be maintained constant. Moreover the value of the accurate measurement is doubled until no further coincidence is to be observed.

According to a third modified embodiment of the method, when a coincidence is observed between a $\gamma$ interval and the echo signal of the echo-sounding signal, the following transmitted signal is interrupted in the course of the transmission (e.g., $E_n$ in diagram $h$) and, during this additional interruption, the frequency is measured on an undisturbed portion of the echo signal. The duration $\gamma$ of each signal is kept constant and an additionl interruption is provided within each of the following cycles where a coincidence is detected. In such a case, in order to avoid that the interruption of the received signal which corresponds to the additional interruption performed in the course of the transmission of signal $E_n$, for example, may be in coincidence with the additional interruption performed during the transmission of signal $E_{n+1}$, the recurrence period T of these additional interruptions is varied by varying at each transmission, the successive interruption times $t_i$, $t_{i+1}$.

Another important feature of the method consists in controlling the starting time $t_2$ of the measurement by the starting time $t_1$ of each $\gamma$ time interval, so as to perform a spatial filtering of the received frequencies. Referring now to FIG. 1, it can be seen that the signals transmitted along one of the directions included in the secondary lobe whose axis is close to a vertical line, are not or only to a small extent affected by the Doppler's effect. The detection of the echo of such signals, of a frequency equal or close to the transmission frequency, results in a widening of the Doppler's frequency spectrum towards the latter.

An error results in the form of a lessening of the measurement value of the detected mean spectrum frequency and, consequently a measurement disturbance.

This defect is particularly noticeable in the case of a surface ship moving in a rough water, to the extent that a decrease of angle $\beta$ due to the pitching effect, results in the enhancing of the amplitudes of the signals whose frequency is between the transmission frequency $F_o$ and the frequency $F_o + \Delta F$ usually observed along the direction defined by $\beta$.

It can be observed that the travel time of the transmitted acoustic waves from the vehicle to the surface and back along a vertical direction is :

$$\Delta T = 2 \, Z/C \qquad (13)$$

An efficient spatial filtering, whereby the influence of the signals transmitted along a direction close to a vertical line can be eliminated, will be achieved by delaying the starting time $t_2$ of the "measuring gap" with respect to time $t_1$, by a time interval of $\Delta t$ (FIG. 2).

This interval $\Delta t$ can be calculated from the measured value of the propagation time forth and back of the echo-sounding pulses transmitted during the interruption time intervals.

Figure 3:
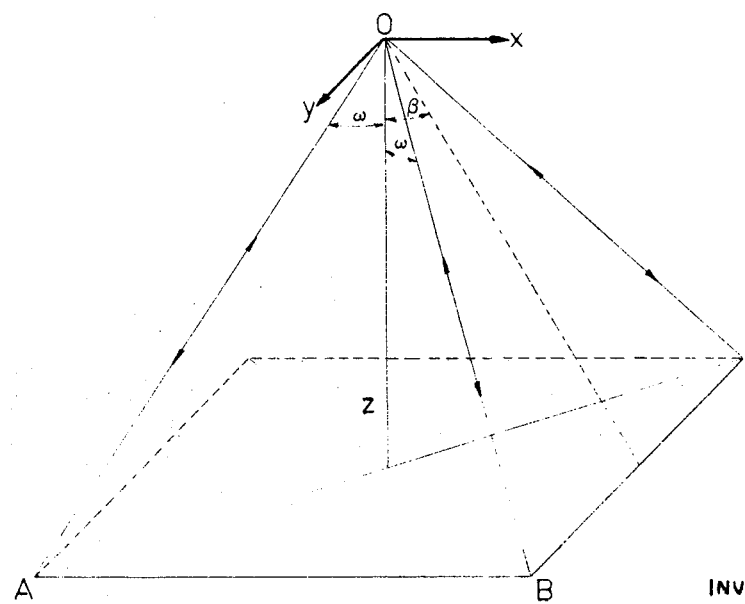
FIG. 3 shows the position of the transmission and reception beams from which can be determined the displacement of the vehicle with respect to two orthogonal directions.

FIG. 3 shows the arrangement of the transmission directions of a set of transmitting-receiving transducers which makes it possible to eliminate or reduce the influence of the rolling and pitching movements when the device for performing the method is on board and also to measure the space travelled over along two orthogonal directions.

According to a known arrangement, the device for performing the method comprises three operating transducers whose axes are respectively oriented along directions parallel to three of the edges (e.g., OA, OB, OC) of a square-base pyramid and symmetrically with respect to a vertical line. $\omega$ designates the common inclination angle of the transmission axes with respect to a vertical line. The sides AB and AC are placed along two axes respectively parallel to the longitudinal and to the transversal axes of the vehicle. This arrangement provides for a good compensation of the parasitic effects due to the rolling and the pitching. It also provides a good compenation of the effect due to the slope of the reference surface, irrespective of its inclination with respect to the vehicle axes. The selected form of the pyramid is of course non limitative of the invention. It could be also possible to orient the transducers axes so that the pyramid base be rectangular or in the form of a lozenge for example.

The frequency shift due to the Doppler's effect is measured by directly substracting the frequencies of the signals reflected along directions OB and OA on the one hand and OB and OC on the other hand. $F_o + \Delta F$ and $F_o - \Delta F$ being used to designate for example the frequencies $F_B$ and $F_A$ of the signals received along OB and OA, there is measured the value:

$$\Delta F_{AB} = F_B - F_A = 2 \, \Delta F \qquad (14)$$

With the same notations as hereabove defined the space $E_{\Gamma x}$ travelled over by the vehicle in the direction of axis $O_x$, during the time interval $\Gamma$, can be written:

$$E_{\Gamma x} \approx \lambda_o (N_2 - N_1) 2^k \qquad (15)$$

Similarly, the space $E_{\Gamma y}$ travelled over by the vehicle in the direction of the axis $O_y$, during the same time interval can be written:

$$E_{\Gamma y} \approx \lambda_o (N_3 - N_1) 2^k \qquad (16)$$

In these last mentioned relationships $N_1 N_2$ and $N_3$ are respectively the number of periods $t_o$ included in N' periods of the signals received respectively along OB, OA and OC. $k$ is a coefficient which is deduced from coefficient $\rho$ (see equation 10) by the following relationship:

$$k = k' \, (\rho - 1)$$

wherein $k'$ is a proportionality factor depending on the arrangement of the transmission axes system.

As a matter of fact, the frequency shifts detected along the axes OA, OB and OC are proportional to the projection of the velocity vector on said axes and consequently to the value of sin $\omega$. The coefficient $k'$ depends on the ratio between the respective values of angles $\beta$ and $\omega$. For sake of simplicity the value of angle $\omega$ can be selected so that $k$ be equal to $(\rho-1)$.

The device for performing the method of the invention comprises a transmission set, a reception and commutation set and a synchronizer for coordinating the operation of these sets.

The transmission set illustrated in FIG. 4 comprises an oscillator 2 generating oscillations at frequency $F_1$ and oscillations at frequency $F_o$, respectively used as echo-sounding signals and as signals for the measurement of the Doppler's effect.

A modulator 3, controlled by the synchronizer, gives passage to the signals at frequency $F_o$, during the successive time intervals $\delta$, and to the signals at frequency $F_1$ during time intervals shorter than the $\gamma$ intervals of transmission interruptions.

The signals issued from the modulator feed three transmission channels each comprising an amplifier called "driver" (3a, 3b and 3c), a power generator (4a, 4b and 4c) and a transducer (5a, 5b and 5c). The three transducers are oriented along the directions defined in FIG. 3.

The reception device, illustrated in FIG. 5, comprises three reception channels connected to three transducers. Each channel comprises, in series and in successive order, a preamplifier (6a, 6b and 6c), a frequency follower (7a, 7b and 7c) and a frequency meter (8a, 8b and 8c) counting the number of pulses $N_1$, $N_2$ or $N_3$ at the "clock" frequency $2^n F_o$, from a starting time defined by a control signal DM. The latter, as well as the clock pulses, are generated by the synchronizer 1. The frequency meters 8a and 8b are connected to a summing unit 10 operating the substraction $N_1 - N_2$ of the accrued number of pulses therein. Similarly the frequency meters 8a and 8c are connected to a summing unit operating the substraction $N_1 - N_3$ of the accrued number of pulses therein.

These connections are performed through three AND gates 9a, 9b and 9c, triggered to an open position through a so-called "Transfer start" signal DT generated by the synchronizer 1. This signal DT is generated only when the echo-signals of the echo-sounding signals do not coincide with the time intervals $\gamma$ (see FIG. 2), the echo-sounding signal ES being provided as an output of the frequency followers.

The reception set also comprises two viewing devices 12 and 13, connected to the summing units 10 and 11, which convert the differences $N_1 - N_2$ and $N_2 - N_3$ to distance indicating values and display them in the selected units by multiplying the differences in accordance with equations (15) and (16), respectively.

One of the particular features of the reception set is the use of a counting at high frequency. The respective frequencies of the signals issued from transducers 5a, 5b and 5c are directly and separatedly calculated instad of calculating the frequencies of the low frequency signals, obtained by demodulation, with respect to one another.

This arrangement of the set results in a greater accuracy of the measurements.

In the general case where the transmission axis is the same as the reception axis, or still when the measurements carried out along the three axes are independent from one another, a summing unit, such as 10 or 11, will be connected to each output terminal of the AND gates 9a, 9b and 9c. These summing units will substract from numbers $N_1$, $N_2$ and $N_3$, a number $N_o$ (see equation 11) of pulses produced by an oscillator at a frequency identical to that used for the transmission.

Another particular feature of the reception set makes it possible to use a single transducer for each direction of transmission and reception of the echo-sounding signals and of the frequency measuring signals. As frequency $F_1$ of the echo-sounding signals there is selected a second frequency, specific of the transducers. For detecting the echo of the echo-sounding signals which, outside the critical distances, arrives at the transducer during the transmission of the frequency measuring signals, use is made of the principle known in the art as "rejection of the common mode."

The circuit illustrated in FIG. 6 connects one of the transmitters, e.g. 4a, to the transducer 5a and to the input of the corresponding channel of the reception set.

It comprises for example two transformers 14 and 15 connecting the transducer, respectively to generator 4a and "driver" preamplifier 6a. The latter is of a differential type and has a second input directly connected to generator 4a. It is easily apparent, from this arangement, that the echos of the echo-sounding signals $ES(F_1)$ and of the frequency measuring signals are transmitted to the reception set through preamplifier 6a. The transmitted signals are rejected since they are superimposed, in preamplifier 6a, to the signals directly issuing from generator 4a.

The synchronizer diagrammatically shown in FIG. 7 comprises two binary counters $C_1$ and $C_2$ fed with pulses at a predetermined frequency called "clock-frequency" $H_1$ and producing at a series of successive separate outputs, a series of pulses defining the successive recurrence times, at regular time intervals from one another. The counter $C_1$ is used when the recurrence period $\Gamma$ (see FIG. 2) is constant. The signals $REC_1$ transmitted therefrom, when it reaches its maximum capacity, define the periods $\Gamma$. The counter $C_2$ is used only when the recurrence period $\Gamma$ is irregular and varies about a mean constant value.

The synchronizer also comprises a set of electronic gates and flip-flop circuits generating, from pulses issued from counters $C_1$ and $C_2$, the signals for controlling the transmission set and the reception set. The set of gates includes two AND gates 161 and 162 respectively connected to the output terminals, referred to as $S_5$, of $C_1$ and $C_2$, two AND gates 171 and 172, respectively connected to the output terminals, referred to as $S_{25}$, of $C_1$ and $C_2$, two AND gates 181 and 182, respectively connected to the output terminals, referred to as $S_{35}$, of $C_1$ and $C_2$ and two AND gates 191 and 92, respectively connected to the output terminal, referred to as $S_{360}$, of $C_1$ and to an output terminal of an OR gate 36, delivering pulses for the reset to zero (RAZ) of counter $C_2$. The pairs of gates 161 and 162, 171 and 172, 181 and 182, 191 and 192, respectively deliver, through OR gates 31, 32, 33, 34 a measurement starting signal DM (instant $t_2$), a transmission starting signal DE (instant $t_4$), a signal FS indicating the beginning of the transfer of the pulses contained in the summing units 10 and 11 to the devices 12 and 13 (FIG. 5), and a signal FE controlling the transmission interruption at time $t_1$. Two flip-flop circuits 38 and 39 one of which is controlled by the respective signals delivered at the output terminals referred to as S 350 and S 1C of $C_1$ and the other by the recurrence signal $REC_1$ and the signal delivered at the output terminal referred to as S 25 of $C_1$. generate signals FA and CE delimiting respectively the reference time interval and the transmission interruption interval.

The selection of the AND gate from each pair of gates 161, 162 etc ..., is controlled by a flip-flop circuit 40. During the regular cycles at constant period $\Gamma$, only the AND gates connected to the output terminals of counter $C_1$ are activated.

In the case of coincidence at an AND gate 22 of the echo-sounding signal ES with the signal corresponding to the reference time interval FA, the triggering of the flip-flop circuit 40 authorizes the opening of the AND gates connected to the output terminals of counter $C_2$. The flip-flop 40 is otherwise actuated through an OR gate 35 by a signal resetting to zero the counter $C_2$ (RAZ $C_2$) and by a signal issued from an AND gate 21. The latter gate is actuated by signal $REC_2$ transmitted simultaneously with signal RAZ $C_2$ and by the signal issued from the output terminal of the flip-flop circuit 40, generating signals for releasing gates 162-192.

When, at an AND gate 24, a coincidence occurs between signals CE, FA and ES, i.e. when the echo-signal (e.g. I'n) of the echo-sounding signal $I_n$ coincides with a transmission interruption interval Y (see FIG. 3), a measurement inhibiting signal referenced IHM is generated by said AND gate 24.

The synchronizer also comprises two AND gates 29 and 30 whose input terminals are respectively connected to the output terminals referred to as S 480 and S 420 of counter $C_2$ and are each actuated by the signals issued from one of the output terminals of flip-flop 41. The signals issued from the AND gates 29 and 30, pass through an OR gate 36 and form the reset signals for counter $C_2$ (RAZ$C_2$) as well as the signals $REC_2$ feeding one of the input terminals of the AND gate 21. The signal IHM is used for closing an AND gate 20, receiving the signals issued from the OR gate 32. When the AND gate 20 is open the signal generated thereby is used as transfer order of the pulses contained in the counters 10 and 11 (see FIG. 5) to the viewing sets 12 and 13. The order IHM prevents that erroneous measurements, that could have been performed during the measuring interval, be taken into account.

The flip-flop 41 is actuated by the signal IHM at its input terminal called "clock input." As above stated, in the presence of a measurement inhibition, the following transmitted signal has a lengthened duration Γ' as compared to the normal recurrence period Γ of the transmission. This shifting of the transmission end is insured by a signal issued from gate 30. In the case where successive shiftings are necessary, the flip-flop 51 alternately actuates the gate 29 and the gate 30. Accordingly the reset signal of counter $C_2$ is alternatively delayed by two predetermined time intervals, as long as the vehicle is close to a critical distance. Finally the signal transmitted from flip-flop 40, when signals ES and FA coincide, authorizes the opening of an AND gate 33 and the reset at 35 of counter $C_2$.

The synchronizer is entirely automatic. Optionally, however, a further circuit may be added thereto for manual operation. This circuit comprises three flip-flop circuits 42, 43, 44, controlled by three push-buttons (not shown) for selecting any one thereform. These flip-flops are fed, at their inlet terminals, called clock terminals, with a signal issued from an AND gate 28 triggered by means of a signal REC, either $REC_1$ or $REC_2$. This signal, issued from gate 28 consists of pulses at a reference frequency $H_1$. Three AND gates 25, 26 and 27 are fed on the one hand, respectively with the signals issuing from the flip-flops 42, 43 and 44 and, on the other hand, with pulses at three different frequencies which are multiples of one another. One of these frequencies is identical to $H_1$. These three AND gates 25, 26 and 27 deliver, through an OR gate 37, a reference signal used for counting the pulses in counters $C_1$ and $C_2$ and in frequency meters $8a$, $8b$ or $8c$ (FIG. 5). With the automatic operation of the flip-flop 42 is put into service. By the use of flip-flops 42 and 43 it is possible for example, to double or quadruple the length of the measuring time interval and to increase the intrinsic accuracy of the measurement. The described circuit comprises three push-buttons for manual operation. This number is only illustrative and can be changed in accordance with the number of desired operating manners, without departing from the spirit of this disclosure and the scope of the appended claims.

What I claim as this invention is:

1. A method for determining the distance travelled by a vehicle moving in a water body with respect to the water bottom surface comprising, in a series of recurring periods each including a transmission time interval followed with a time interval of transmission interruption:
   a. transmitting during each transmission time interval, acoustic signals at a determined frequency along at least one inclined direction with respect to the surface,
   b. detecting during the time interval of transmission interruption the signals received along said direction, said time interval of interruption being constant,
   c. determining the difference between a counting time interval equal to the duration of a predetermined number of cycles of a reference signal and another counting time interval equal to the duration of the same number of cycles of the signals, received along said direction,
   d. deducing therefrom the distance travelled by the vehicle as a value proportional to said difference.
   e. maintaining a constant value for the mean recurrence period calculated over a predetermined whole number of periods lower than the total number of periods of the series, whereby said value is independent from the variation of the distance between the vehice and the surface.

2. A method according to claim 1, wherein the measurement of said counting time intervals is performed, during each transmission interruption, over a substantially constant number of cycles, inside the same series of periods.

3. A method according to claim 1, wherein the duration of each transmitted signal is longer than the corresponding transmission interruption interval.

4. A method according to claim 1, wherein the transmission time intervals are constant.

5. A method according to claim 2, wherein the beginning of the counting time intervals is delayed with respect to the beginning of the successive interruptions by a time interval proportional to the distance from the vehicle to the surface.

6. A method according to claim 1, wherein the recurrence period being constant, the detection of the received signals is performed during additional time intervals of transmission interruption provided within the transmission intervals when the recurrence period is substantially equal to the time interval separating transmission and reception of acoustic signals.

7. A method according to claim 1, wherein the predetermined whole number of period being two, one of the transmission interruptions is delayed when the transmission time interval between two successive transmission interruptions is slightly longer than the time interval separating transmission and reception of acoustic waves.

8. A method according to claim 1, wherein the predetermined whole number of periods being two, the detection of the received signals is cancelled when the transmission time interval between two successive transmission interruptions is substantially equal to the time interval separating transmission and reception of acoustic signals, and the next transmission interruption is delayed.

9. A method according to claim 6, wherein the time interval separating transmission and reception of acoustic signals is determined on the basis of the propagation time of pulses transmitted within each transmission interruption time interval.

10. A method according to claim 7, wherein the time interval separating transmission and reception of acoustic signals is determined on the basis of the propagation time of pulses transmitted within each transmission interruption time interval.

11. A method according to claim 8, wherein the time interval separating transmission and reception of acoustic signals is determined on the basis of the propagation time of pulses transmitted within each transmission interruption time interval.

12. A method according to claim 1, wherein the reference signal is the transmitting signal.

13. A method according to claim 1, wherein the reference signal is the signal received along another direction.

14. A method for determining the distance travelled by a vehicle moving in a water body with respect to the water bottom surface comprising, in a series of periods each including a transmission time interval followed with a time interval of transmission interruption:
   a. transmitting during each transmission time interval, acoustic signals at a determined frequency along at least one inclined direction with respect to the surface, b. detecting during the time interval of transmission interruption the signals received along said direction, c. determining the difference between a counting time interval equal to the duration of a predetermined number of cycles of a reference signal and another counting time interval equal to the duration of the same number of cycles of the signals received along said direction, d. deducing therefrom the distance travelled by the vehicle as a value proportional to said difference.

15. A system for determining the distance travelled by a vehicle moving in a water body with respect to the water bottom surface comprising means for generating a first signal at a predetermined frequency, means for transmitting the signals towards the surface along at least one transmitting direction, means for receiving the signals reflected from the surface along the transmitting direction, means for amplifying the received signals, means for generating a local signal whose frequency is a multiple of the transmitted signals, first means for counting from a selected time the number of cycles of the local signal contained in a predetermined number of cycles of the signals received along the transmission direction, second means for counting from a selected time the number of cycles of the local signal contained in the same predetermined number of cycles of the transmitted signals, means for subtracting the signals transferred respectively from the first and second counting means, and means for multiplying the signal transferred from the subtracting means by a predetermined factor whereby distance indicating values are produced.

16. A system for determining the distance travelled by a vehicle moving in a water body with respect to the water bottom surface comprising means for generating signals at a predetermined frequency, means for transmitting the signals towards the surface along three transmitting directions, means for receiving the signals reflected from the surface along the transmitting directions, means for amplifying the received signals, means for generating a local signal whose frequency is a multiple of the frequency of the transmitted signals, first means for counting from a selected time the number of cycles of the local signal contained in a predetermined number of cycles of the signals received along a first transmission direction, second and third means for counting from a selected time the number of cycles of the local signal contained in the same predetermined number of cycles of the signals received along the second and third transmitting directions respectively, means for subtracting the signals transferred from the first counting means, and respectively the second and third counting means, means for multiplying the signals transferred from the subtracting means by a predetermined factor whereby values indicating distance travelled along two different directions are produced.

17. A system for determining the distance travelled by a vehicle moving in a water body with respect to the water bottom surface comprising means for generating a first signal at a predetermined frequency, means for transmitting the signals towards the surface along at least one transmitting direction, means for receiving the signals reflected from the surface along the transmitting direction, means for amplifying the received signals, first means for counting the number of cycles of a local signal whose frequency is a multiple of the frequency of the transmitted signals contained in a predetermined number of cycles of the signals received along the transmission direction, second means for counting the number of cycles of the local signal contained in the same predetermined number of cycles of the transmitted signals, means for measuring the difference between the signals issued respectively from the first and second counting means, means for multiplying said difference by a predetermined factor whereby distance indicating values are produced, and synchronizing means including first means for producing a signal for controlling the counting means, second means for producing a signal for controlling the transfer of the signals issued from the counting means to the measuring means and third means for producing a signal controlling the transfer of the signals issued from the measuring means to the multiplying means.

18. A system according to claim 17, also comprising means for generating echo-sounding pulses at a frequency different from that of the first signal generated and wherein the synchronizing means comprises a fourth means for controlling the of the first signal during successive transmission intervals separated by intervals of transmission interruption and a fifth means for controlling the transmission of the pulses during the successive intervals of transmission interruption.

19. A system according to claim 18, comprising an element for detecting the echos of the transmitted pulses which consists of a differential amplifier whose input terminals are respectively connected to the transmission means to the means of producing signals.

20. A system according to claim 18, wherein the synchronizing means comprises a first counter of steady recurrence period, fed with pulses and producing recurrent pulses at different times, a second counter having a higher capacity than said first counter and a variable recurrence period, fed with pulses, and delivering, at its output terminals, recurrent pulses at time intervals from one another, means connected to preselected output terminals of the first and second counters, for generating signals for controlling the beginning of the measurement of the time interval corresponding to the duration of said predetermined number of cycles of the received signals, signals for controlling the beginning of the transmission, signals for controlling the multiplying means and signals for controlling the transmission interruption, means connected to preselected output terminals of the first counter, for generating signals at a constant recurrence period and defining a reference time interval longer than the duration of the transmission interruptions and signals defining a time interval equal to the selected duration of the transmission interruptions, means for selecting the second counter when a coincidence is observed betwween the echo-signals of the transmitted pulses and the signals defining said reference time interval and for selecting the first counter when the echo-signals of the transmitted pulses are received outside from the reference time interval, means for selecting the time of reset to zero and the recurrence period of the second counter, according to the presence or the absence of a triple coincidence between the echo-signals of the transmitted pulses, the signals defining a time interval equal to the duration of the transmission interruptions and the signals defining the time interval longer than the duration of the transmission interruptions, and means for generating a signal prohibiting the transfer of the measurements from said first and second counting means to the multiplying means when the triple coincidence is observed.

21. A system according to claim 20, further comprising manual control means for selecting the frequency of the pulses feeding the counters.

22. A system for determining the distance travelled by a vehicle moving in a water body with respect to the water bottom surface comprising means for generating signals at a predetermined frequency, means for transmitting the signals towards the surface along three transmitting directions, means for receiving the signals reflected from the surface along the transmitting directions, means for amplifying the received signals, first means for counting the number of cycles of a local signal whose frequency is a multiple of the frequency of the transmitted signals contained in a predetermined number of cycles of the signals received along a first transmission direction, second and third means for counting the number of cycles of the local signal contained in the same predetermined number of cycles of the signals received along the second and third transmitting directions respectively, means for measuring the difference between the signals issued from the first counting means, and respectively the second and third counting means, means for multiplying said differences by a predetermined factor whereby values indicating distance travelled along two different directions are produced, and synchronizing means including first means for producing a signal for controlling the counting means, second means for producing a signal for controlling the transfer of the signals issued from the counting means to the measuring means and third means for producing a signal controlling the transfer of the signals issued from the measuring means to the multiplying means.

* * * * *